United States Patent [19]

Oxley

[11] 4,178,622

[45] Dec. 11, 1979

[54] COMPACT, FLAT TRIMMER CAPACITORS

[76] Inventor: Robert F. Oxley, 8 rue Pedro-Meylan, Geneva 1208, Switzerland

[21] Appl. No.: 828,706

[22] Filed: Aug. 29, 1977

[30] Foreign Application Priority Data

Sep. 18, 1976 [GB] United Kingdom ............... 38796/76

[51] Int. Cl.² ............................................ H01G 5/04
[52] U.S. Cl. .................................. 361/293; 361/292
[58] Field of Search ............... 361/292, 271, 294, 293; 73/10.6

[56] References Cited

U.S. PATENT DOCUMENTS

| | | | |
|---|---|---|---|
| 2,694,710 | 9/1972 | Kirschner | 361/271 X |
| 2,978,638 | 4/1961 | Wing | 361/292 X |
| 3,007,093 | 10/1961 | Potter | 361/292 |
| 3,353,416 | 11/1967 | Flint | 74/10.6 |
| 3,360,697 | 12/1967 | Seiden | 361/294 |
| 3,754,152 | 8/1973 | Koehler | 361/271 X |
| 3,775,647 | 11/1973 | Bower | 361/292 |

FOREIGN PATENT DOCUMENTS 47-26275 6/1969 Japan ....................................... 361/292

Primary Examiner—E. A. Goldberg
Attorney, Agent, or Firm—Jim Zegeer

[57] ABSTRACT

The disclosure is directed to a variable electrical device, such as a trimmer capacitor, in which the position of one component of the device is linearly adjustable in relation to a second component of the device by means of an adjusting mechanism comprising a spiral-like groove linked to one of said components, the other component being fixed relative to an axis about which the spiral can be rotated. The spiral groove is carried by a third member which is rotatable about the aforementioned axis. A projection which is fixed relative to the first component is slidably received in the spiral groove whereby rotation of the third member causes the projection to move along the groove and hence the first member to be linearly displaced relative to the second.

9 Claims, 8 Drawing Figures

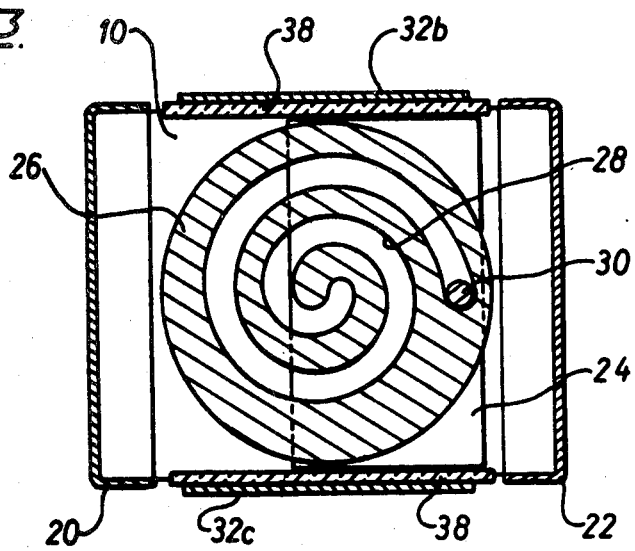
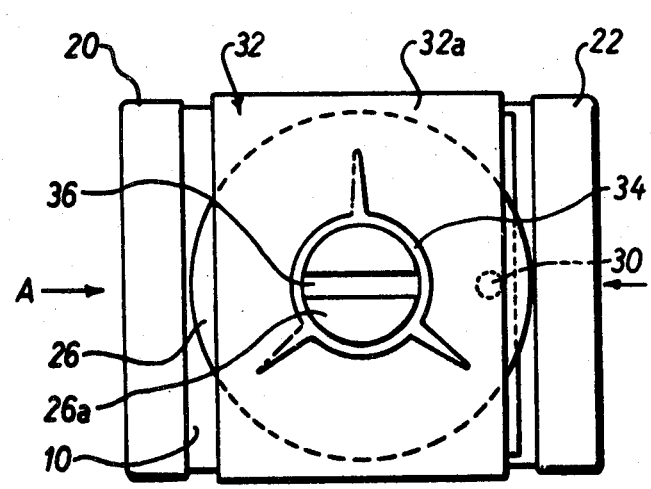
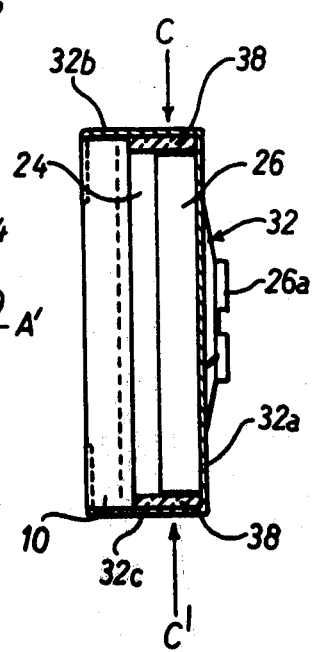
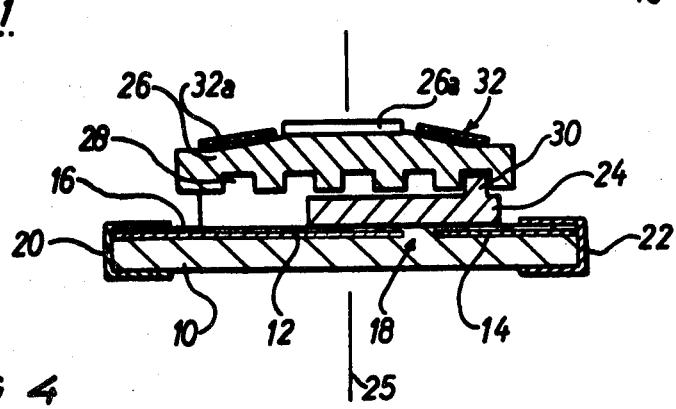

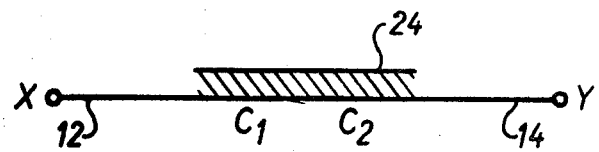
FIG 5
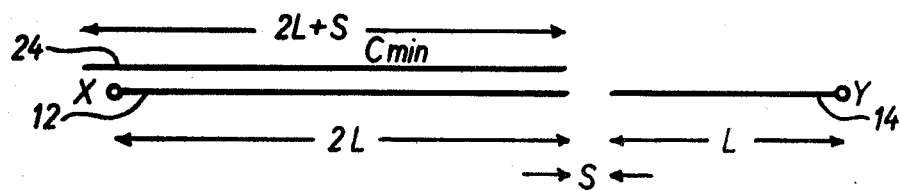
FIG 6a
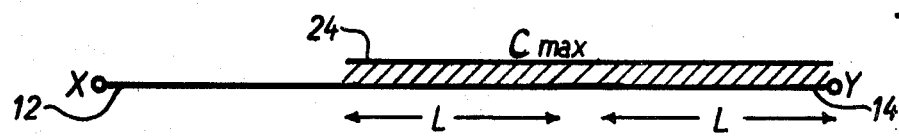
FIG 6b
FIG 7
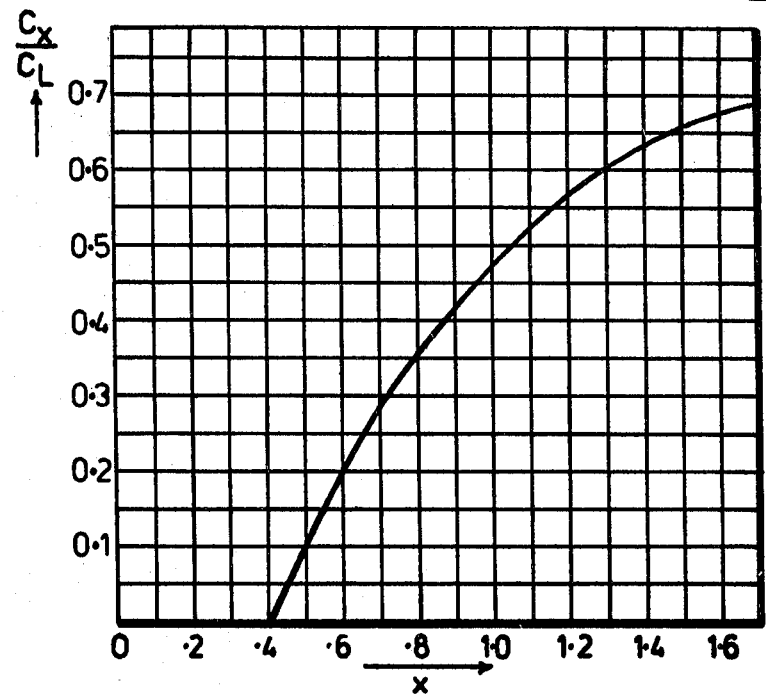

COMPACT, FLAT TRIMMER CAPACITORS

The present invention relates to variable electronic components and in particular to trimmer capacitors.

Although applicable to many variable electrical devices, the invention is particularly applicable to miniature variable capacitors (trimmers). Conventional trimmer capacitors are generally of two types. One type comprises a rotor which is rotatably mounted on a fixed stator, the rotor and stator carrying the fixed and movable electrodes of the capacitor. A disadvantage of this type of variable capacitor is that the rotor has a maximum adjustment of 180° which in many applications can give insufficient resolution. The other conventional type comprises tubular and/or cylindrical fixed and movable parts, one of which is displaceable relative to the other by some form of screw arrangement. Normally, this results in a device having excessively fine adjustment which requires multiple turns of an adjusting tool. Both of the aforedescribed conventional trimmers also have the disadvantage that their dimensional parameters are such that, especially when used at high frequencies, they result in unacceptably high inductance and/or losses.

One object of the present invention is to provide a trimmer capacitor in which the aforegoing disadvantages of the conventional trimmers are substantially reduced.

In accordance with one aspect of the invention, there is provided a variable electrical capacitor device in which the position of one component of the capacitor device is linearly adjustable in relation to a second component of the device by means of an adjusting mechanism comprising a spiral-like groove linked to one of said components, the other component being fixed relative to an axis about which the spiral-like groove can be rotated.

In accordance with a second aspect of the invention, there is provided a variable electrical capacitor device comprising two relatively displaceable members, means constraining a first of said members for linear displacement relative to the second member, a third member which is rotatable about an axis fixed relative to the second member and which carries a spiral groove, and a projection fixed relative to the first member which is slidably received in the spiral groove whereby rotation of the third member causes the projection to move along the groove and hence the first member to be linearly displaced relative to the second.

In one embodiment, the variable electrical capacitor device is in the form of a trimmer capacitor, the second member carrying a pair of fixed coplanar metallic electrodes and the first member forming or carrying a third metallic electrode whose position relative to the fixed electrodes is to be variable for adjusting the capacitance of the trimmer.

The fixed electrodes can be immersed in a dielectric base, in which case the third electrode can be in the form of a metal plate. In other embodiments, the fixed electrodes can be carried on an external surface of a dielectric base, in which case the third electrode carries an insulating layer to electrically isolate it from the other electrodes.

In accordance with a third aspect of the invention, there is provided a trimmer capacitor comprising a base member carrying a pair of spaced coplanar electrodes on or beneath a flat surface thereof, a metallic shuttle member slidably mounted on the flat surface of the base member and constrained for displacement along a linear path, a disc mounted over the shuttle member such as to be rotatable about its axis in a plane parallel to the shuttle but to be constrained from axial movement relative to the base, the disc having a spiral-like groove on its underside which slidably receives a projection fixed relative to the shuttle whereby rotation of the disc causes the projection to move along the groove and hence the shuttle to be displaced along said path relative to the base and the fixed electrodes carried thereby.

The invention is described further hereinafter, by way of example, with reference to the accompanying drawings, in which:

FIG. 1 is a diagrammatic plan view of one embodiment of a variable electrical component in accordance with the present invention in the form of a trimmer capacitor;

FIG. 2 is an end elevation of the trimmer of FIG. 1;

FIG. 3 is a sectional plan view on CC' in FIG. 2;

FIG. 4 is a sectional side elevation on AA' in FIG. 1;

FIG. 5 is a diagram illustrating the operating principle of a capacitor in accordance with the invention;

FIGS. 6a and 6b are diagrams illustrating preferred relative dimensions for a capacitor in accordance with the invention; and FIG. 7 is a graph illustrating a typical operating characteristic obtainable with a capacitor having the configuration illustrated in FIG. 6.

The illustrated trimmer comprises a rectangular monolithic ceramic base 10 having two flat rectangular coplanar metal electrodes 12,14 embedded therein. As seen in FIG. 4, the electrodes lie close to and parallel with a flat upper surface 16 of the base 10 and are laterally separated from each other by a small uniform gap 18. The lateral edges of the electrodes 12,14 remote from the gap 18 extend to the corresponding side edges of the base where they make electrical contact with respective metallised terminations 20,22 which wrap around the latter edges of the base 10 as best seen in FIG. 4. Thus, the electrodes 12,14 are totally embedded in the base except where they contact the terminations 20,22.

Since the electrodes 12,14 are coplanar, the basic capacitance between them is extremely small. Capacitative coupling between the electrodes 12,14 is achieved by the provision of a rectangular metallic shuttle 24 which is mounted so as to be transversely slidable on the surface 16 of the base between two extreme positions in one of which it lies only over the electrode 12 and in the other of which it lies over at least part of both electrodes 12,14, the latter positions normally being arranged to correspond to conditions of minimum and maximum capacitance, respectively. The relative dimensions of the electrodes and the shuttle will be considered further below.

The capacitance corresponding to any position of the shuttle 24 clearly depends upon the relative opposing areas of the two electrodes 12,14 and the shuttle 24 so that for varying the capacitance of the trimmer the position of the shuttle relative to the electrodes must be accurately controllable. The mechanism by which a controlled lateral movement of the shuttle is achieved comprises a circular disc 26 of an electrically insulating material having a spiral-like groove 28 on its underside surface which receives an upwardly projecting pip 30 on the upper surface of the shuttle 24. The disc 26 has a diameter substantially equal to the longitudinal dimension of the shuttle 24 and is mounted in the trimmer by means of a clip 32 such that it lies in a plane parallel to and above the respective planes containing the shuttle 24 and base 10 and such that it can rotate about its central axis 25 whilst being constrained against axial displacement. For this purpose, the clip 32 has a main part 32a which lies outwardly of the disc 26, and a pair of lateral limbs 32b,32c which wrap around two opposite edges of the base 10 to clamp the disc 26, shuttle 24 and base 10 together. The main part 32a of the clip has a central aperture 34 through which a raised central portion 26a of the disc 26 projects, the portion 26a carrying a slot 36 for receiving a suitable tool, such as a screw driver blade, to enable the disc 26 to be rotated relative to the base 10.

Since the longitudinal end edges of the metallic shuttle must clearly not make electrical contact with the clip, which is normally also metallic, a pair of insulating guides 38 (for example of P.T.F.E.) are provided between the end edges of the shuttle, the periphery of the disc 26 and the limbs 32a,32b of the clip, as best seen in FIGS. 2 and 3.

Rotation of the disc 26 forces the pip 30 to move along the spiral groove on its underside. Since, however, the shuttle is constrained by the guides 38 and clip 32 to move only in one dimension, i.e. left to right or right to left as viewed in FIG. 3, such rotation causes the shuttle to move one way or the other in dependence upon the direction of rotation. In the case of a true spiral, it will be noted that the linear movement of the shuttle is directly proportional to the angular rotation of the disc 26.

The change in capacitance for a given displacement of the shuttle clearly depends upon the relative areas of the two electrodes 12,14 and of the shuttle 24. For example, if the two electrodes and the shuttle all have the same area and the shuttle can move between extreme positions in which it fully overlies one of the electrodes and fully overlies the other of the electrodes, respectively, (see FIG. 5) then the capacitance will be at a minimum value in both extreme positions and will reach a maximum in a central position in which an equal amount of each electrode is covered. Thus, the capacitance will pass from a minimum, through a maximum and back to a minimum in its passage between its extreme positions.

As stated initially, the aforegoing characteristic has the practical disadvantage that, for a given setting of the capacitor, one cannot tell in advance which way the adjusting mechanism must be controlled in order to increase the capacitance since one cannot tell which side of the peak one is at.

It is therefore preferable to have one extreme position correspond to a position of minimum capacitance and one to a position of maximum capacitance, so that one can be certain that displacement of the adjusting mechanism in one direction will always increase the capacitance and vice versa. The present construction is ideally suited to be able to provide such a characteristic by suitable dimensioning of the electrodes 12,14 and shuttle 24.

With reference to FIG. 5 which diagrammatically illustrates the electrodes 12,14 and shuttle 24, the total capacitance C between terminal X and Y is given by:

$$C = (1/C_1) + (1/C_2)$$

where $C_1$ is the capacitance between the overlapping portions of the shuttle and the electrode 12 and $C_2$ is the capacitance between the overlapping portions of the shuttle and the electrode 14.

Clearly, the maximum capacitance which can occur from this combination is when $C_1$ and $C_2$ are equal and hence the maximum possible capacitance swing can be obtained when this condition is available. In practice, this can best be achieved by arranging for the widths of the electrodes 12,14 (i.e. the dimensions of these electrodes visible in FIG. 4) to be in the ratio 2:1, with the width of the shuttle equal to that of the wider electrode plus the width of the gap 18 between the electrodes. This situation is illustrated diagrammatically in FIG. 6. In FIG. 6a, the shuttle of length 2L+S is in its extreme left hand position and lies over the larger electrode of width 2L, the capacitance then being at a minimum. In FIG. 6b, the shuttle is in its extreme right hand position and overlies both electrodes by an equal amount corresponding to a length L. The latter position corresponds to the maximum possible capacitance for a capacitor in which one of the electrodes is of length L and hence to a condition of maximum capacitance swing for a given overall size of capacitor, i.e. a maximum capacitance swing per unit area.

FIG. 7 is a graph showing the typical variation of capacitance with distance x from the minimum capacitance position for a trimmer capacitor incorporating electrodes dimensioned in the aforedescribed 2:1 ratio. A useful feature of this characteristic is that as C max is approached, the rate of increase of capacitance decreases, so that the effective resolution of the device is improved.

Allowing for the necessity for providing end terminations, such as 20 and 22, the trimmer illustrated in FIGS. 1 to 4 has been dimensioned to correspond approximately to the 2:1 condition for the working areas of the electrodes 12 and 14. However, other ratios of these areas could of course be used depending upon the characteristic desired for the capacitor.

It will be noted that when the spiral groove 28 carried by the disc 26 is a "true spiral", i.e. one obeying the equation $r = r\theta$ where $(r,\theta)$ are the polar co-ordinates for any point on the spiral and R is a constant, there is no distortion of the capacitance characteristic of FIG. 7 as a result of the gearing effect of the spiral. In other words the distance x is directly proportional to the angular displacement of the disc 26. However, clearly the groove can be made to conform to shapes other than a true spiral whereby the capacitance characteristic of the trimmer can be tailored to suit a particular application. An example of the latter is in the "pulling" of quartz crystals where specific capacitance characteristics are ideally required to enable linear tuning to be obtained.

Many variations and modifications of the above described device are possible, some of which will be mentioned below.

The embodiment of FIGS. 1 to 4 uses a monolithic base 10 so that the active dielectric between the immersed electrodes and the shuttle is of the same dielectric material as the rest of the base. This is a useful attribute for dielectric loss considerations. Alternatively, however, these portions could be of different materials formed in separate layers with the electrodes disposed in between.

It is not strictly necessary for the electrodes to be immersed in the dielectric at all. For example, the electrodes can be metallised (e.g. silvered) areas on top of a ceramic base and the shuttle can have an oxidised lower surface to provide the necessary insulation and dielectric. For example, the shuttle can be an oxidised silicon chip, or an anodized aluminium plate.

In a further alternative, the shuttle can be of monolithic construction with an immersed metal layer or with a surface metallised layer, in conjunction with either a monolithic ceramic base as in FIGS. 1 to 4 or a metallised ceramic base as described above.

Instead of providing terminations as at 20 and 22, other forms of connection to the electrodes are possible such as, for example, metallised areas or tags.

The illustrated trimmer utilizes a spiral extending over $4\pi$ radians so that it requires two complete revolutions of the disc 26 to displace the shuttle between its extreme positions. Clearly, however, the number of revolutions can be chosen to suit any particular requirement by correspondingly adjusting the length and form of the spiral.

Some of the advantages of the trimmer capacitors described above over a conventional trimmer are as follows:

(a) The spiral mechanism enables multi-turn adjustment from Cmin to Cmax, the number of turns depending, obviously, on the number of turns on the spiral. This combines the high resolution of the conventional tubular trimmer with the compactness of the conventional disc trimmer.

(b) As mentioned previously, adjustment is easier in that rotating the adjusting tool one way always increases capacitance whilst in the other direction the capacitance will always decrease.

(c) The trimmer has an inherently low self inductance. Since the electrodes are coplanar, the inductance clearly approximates, for a given width, to the theoretical minimum. Very high operating frequencies well into the GHz range are therefore possible without self-resonance.

(d) The coplanar configuration is ideally suited for mounting in stripline applications.

(e) The design minimises radiation effects by reducing the amount of 'hot' metal to a minimum; the metal clip holding the device together is insulated from the electrodes (it is also possible that the clip itself can be an insulator), the slotted disc for the screw driver is made of an insulating material to prevent stray effects during screw driver adjustment.

(f) There are no moving electrical contacts, so that contact resistance effects are eliminated.

(g) High Q trimmers are possible, the design being such that the dielectric itself is the only limiting factor.

(h) The capacitance law can be adjusted by the design of the electrode areas in combination with the shape of the spiral. In the example illustrated, the law effectively improves resolution of higher capacitances. This is in contrast to compression type trimmers where the opposite law (due to the I/d effect) is particularly irksome.

The aforegoing description has been concerned with the application of the spiral adjusting mechanism to capacitors. It can, however, be equally well applied to the adjustment of other electrical devices such as variable resistors, variable inductors, transducers and the like, where the position of one member is to be accurately varied in relation to another.

I claim:

1. A trimmer capacitor comprising in combination:
(a) a base member of electrically insulating material having at least one flat side surface;
(b) a pair of uniformly spaced apart, flat, metallic electrodes carried by said base member in a common plane parallel to said flat side surface of the base member;
(c) a shuttle member defining a third flat metallic electrode;
(d) means mounting said shuttle member on said flat surface of the base member for slidable displacement along a linear path;
(e) means electrically insulating the third electrode from the electrodes carried by said base;
(f) a disc member;
(g) clip means engaging the base member and disc member and mounting said disc member over said shuttle member such that said disc member is rotatable about its axis in a plane parallel to the shuttle member but is constrained from axial and transverse movement relative to said base member;
(h) means defining a spiral-like groove in the underside of said disc;
(i) a projection member which is carried by the shuttle and is slidably received in said groove whereby rotation of the disc causes the projection to move along the groove and hence the shuttle to be displaced along said path relative to the base member and the fixed electrodes carried thereby; and
(j) a pair of end terminations disposed at opposite ends of the base member and respectively electrically connected to said electrodes carried by said base member.

2. A trimmer capacitor comprising in combination:
(a) a base member of electrically insulating material having at least one flat side surface;
(b) a pair of uniformly spaced apart, flat, metallic electrodes embedded within said base member in a common plane parallel to said flat side surface of the base member;
(c) a shuttle member defining a third flat metallic electrode;
(d) means mounting said shuttle member on said flat surface of the base member for slidable displacement along a linear path;
(e) a disc member;
(f) clip means engaging the base member and disc member and mounting said disc member over said shuttle member such that said disc member is rotatable about its axis in a plane parallel to the shuttle member but is constrained from axial and transverse movement relative to said base member;
(g) means defining a spiral-like groove on the underside of said disc;
(h) means defining a projection which is carried by the shuttle and is slidably received in said groove whereby rotation of the disc causes the projection to move along the groove and hence the shuttle to be displaced along said path relative to the base member and the fixed electrodes carried thereby; and
(i) a pair of end terminations disposed at opposite ends of the base member and respectively electrically connected to said embedded electrodes.

3. A trimmer capacitor according to claim 2 wherein the shuttle member comprises a flat metal plate carrying said projection on one of its major slide surfaces.

4. A trimmer capacitor according to claim 2 wherein the shuttle member comprises a flat body of electrically insulating material having said third flat metallic electrode embedded therein and carrying said projection on one of its major side surfaces.

5. A trimmer capacitor comprising in combination:
(a) a rectangular base member of electrically insulating material having at least one flat side surface;
(b) a pair of uniformly spaced apart, flat, rectangular metallic electrodes carried by said base member in a common plane parallel to said flat side surface of the base member;
(c) a rectangular shuttle member defining a third flat metallic electrode;
(d) means mounting said shuttle member on said flat surface of the base member for slidable displacement along a linear path;
(e) a disc member;
(f) clip means engaging the base member and disc member and mounting said disc member over said shuttle member such that said disc member is rotatable about its axis in a plane parallel to the shuttle member but is constrained from axial and transverse movement relative to said base member;
(g) means defining a spiral-like groove on the underside of said disc;
(h) a projection member which is carried by the shuttle and is slidably received in said groove whereby rotation of the disc causes the projection to move along the groove and hence the shuttle to be displaced along said path relative to the base member and the fixed electrodes carried thereby; and
(i) a pair of end terminations disposed at opposite ends of the base member and respectively electrically connected to said electrodes carried by said base member;
the widths of the two coplanar electrodes carried by the base member, measured in the direction of displacement of the third electrode, are in the ratio 2:1, and the width of the third electrode, measured in said direction of displacement, is equal to twice the width of the smaller of the two electrodes carried by the base member plus the dimension of the uniform gap between the latter two electrodes.

6. A trimmer capacitor comprising in combination:
(a) a base member of electrically insulating material having at least one flat side surface;
(b) a pair of uniformly spaced apart, flat, metallic electrodes carried by said base member is a common plane parallel to said flat side surface of the base member;
(c) a rectangular metal shuttle member defining a third flat metallic electrode;
(d) means mounting said shuttle member on said flat surface of the base member for slidable displacement along a linear path;
(e) a disc member;
(f) metallic clip means engaging the base member and disc member and monitoring said disc member over said shuttle member such that said disc member is rotatable about its axis in a plane parallel to the shuttle member but is constrained from axial and transverse movement relative to said base member, said clip means having a main portion which lies outwardly to said circular disc and a pair of lateral limbs which wrap around two opposite edges of said base member to clamp the disc, the shuttle and the base members in their operational positions;
(g) means electrically insulating the side edges of the metallic shuttle member from said metallic clip means;
(h) means defining a spiral-like groove on the underside of said disc;
(i) means defining a projection which is carried by the shuttle and is slidably received in said groove whereby rotation of the disc causes the projection to move along the groove and hence the shuttle to be displaced along said path relative to the base member and the fixed electrodes carried thereby; and
(j) a pair of end terminations disposed at opposite ends of the base member and respectively electrically connected to said electrodes carried by said base member.

7. In a compact, flat trimmer capacitor having a fixed pair of spaced flat capacitor plates and a movable flat capacitor plate having a pair of flat parallel surfaces constrained to move along a linear path and in the space between said fixed pair of spaced flat capacitor plates for changing the capacitive coupling between the plates, conductor means connected to said plates for connecting same into an electrical circuit, and drive means coupled to said movable plate for moving said movable plate relative to said pair of fixed plates and along said linear path,
the improvement in said drive means which comprises:
a rotary disc having a spiral cam groove in one flat face thereof and an axis of rotation normal to the plane of said moveable flat capacitor plate,
a follower element on said moveable flat capacitor plate, said follower element being in said spiral cam groove,
and a clip member for securing said rotary disc and said movable plate in relation to each other and said pair of spaced capacitor plates and constraining said movable plate to move along said linear path parallel to said pair of flat plates upon rotation of said disc.

8. The invention defined in claim 7 wherein said follower element projects from one of said flat parallel surfaces of said movable plate parallel to the axis of said rotary disc.

9. The invention defined in claim 7 wherein said pair of fixed plates are coplanar and said linear path is parallel thereto.

* * * * *